United States Patent [19]
King, Sr.

[11] 3,762,437
[45] Oct. 2, 1973

[54] DRAINAGE RESERVOIR

[76] Inventor: Lloyd H. King, Sr., 311 Blake Rd., Hopkins, Minn. 55343

[22] Filed: June 9, 1972

[21] Appl. No.: 261,277

[52] U.S. Cl............ 137/512, 137/525.3, 137/528, 137/608, 61/13, 239/201, 239/207
[51] Int. Cl............................................ F16k 15/03
[58] Field of Search................ 137/236, 512, 107, 137/217, 301, 302, 608, 525.3, 528; 61/11, 12, 13; 239/201, 202, 203, 204, 205, 206, 207; 47/48.5; 138/32

[56] References Cited
UNITED STATES PATENTS

| 1,428,553 | 9/1922 | Oakes | 239/204 X |
|---|---|---|---|
| 1,492,941 | 5/1924 | Sherman | 239/201 X |
| 1,589,252 | 6/1926 | Sherman | 61/12 UX |
| 1,863,919 | 6/1932 | Brooks | 239/204 X |
| 3,333,422 | 8/1967 | Neyland | 61/13 |

Primary Examiner—Harold W. Weakley
Attorney—Leo Gregory

[57] ABSTRACT

A drainage reservoir for an underground watering system consisting of a sump substantially frusto conical in form having a plurality of apertures therein, said apertures comprising drainage valves which include valve members in connection with each of said apertures which yield to the pressure of water within said reservoir to open said apertures for pssage of said water through said apertures and which yield to subsurface water pressures to close said apertures against the entrance of subsurface waters into sad reservoir.

4 Claims, 6 Drawing Figures

PATENTED OCT 2 1973
3,762,437
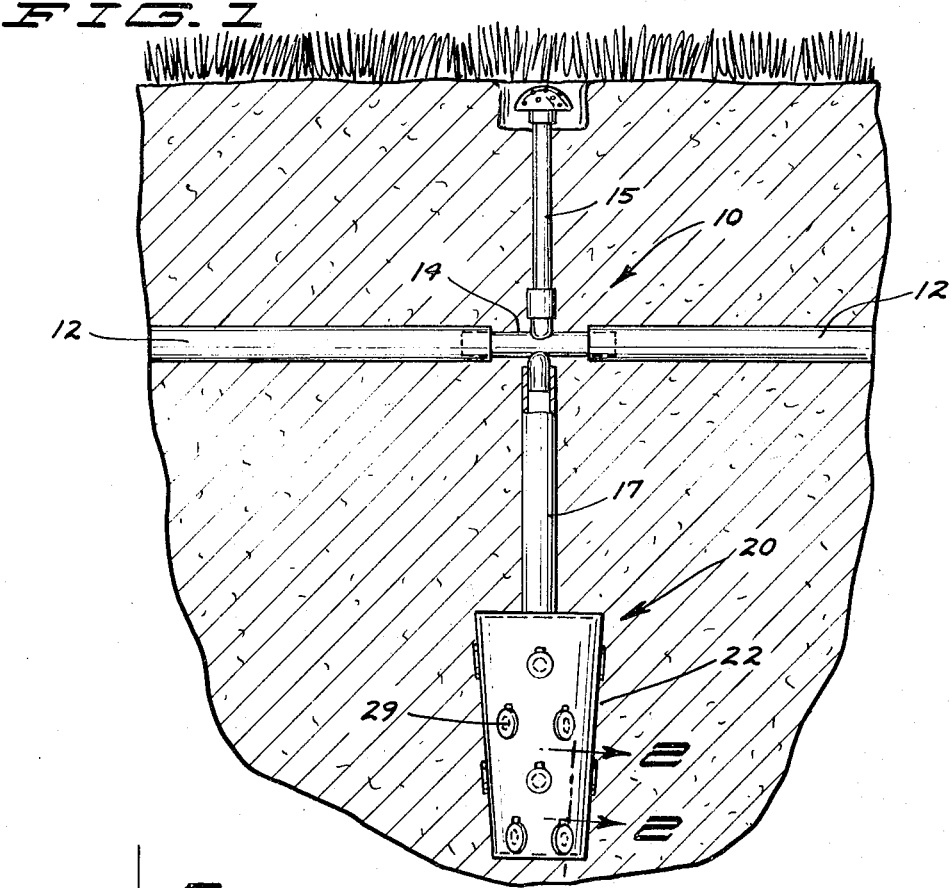
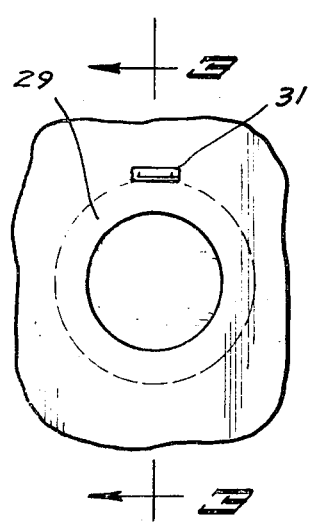
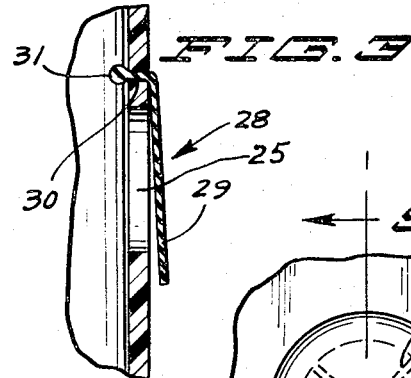
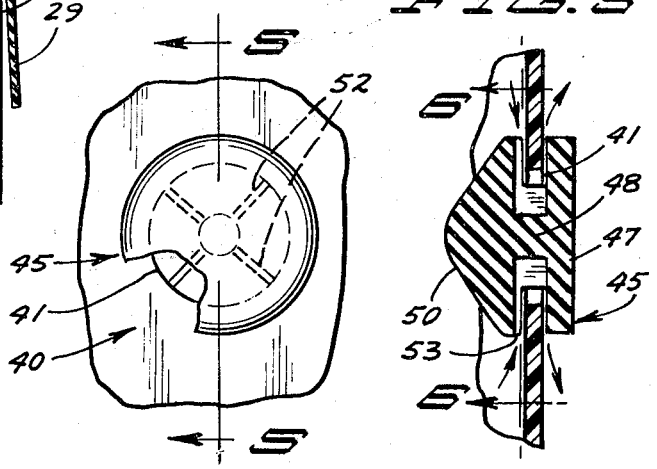
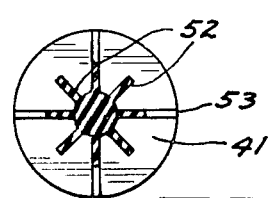

3,762,437

DRAINAGE RESERVOIR

SUMMARY AND BACKGROUND OF THE INVENTION

The invention herein relates to a drainage reservoir for automatic subsurface drainage of water from an underground watering system and to prevent the entrance of subsurface waters thereinto. In many areas where there are freezing temperatures during seasons of the year it is necessary to have some means to drain underground watering systems as generally said systems are not disposed into the ground deeply enough to avoid freezing. It is desirable to have reservoirs to quickly receive the water drained from a watering system and to be self-draining.

It is an object of this invention therefore to provide a plurality of reservoirs in connection with an underground watering system whereby such reservoirs will be located at predetermined distances along the watering system.

It is another object of this invention to provide a drainage reservoir for an underground watering system having a line of said system draining thereinto and having said reservoir arranged and constructed to permit the automatic discharge of water into subsurface areas and to prevent the entrance of subsurface waters thereinto.

It is more specifically an object of this invention to provide a drainage reservoir for an underground watering system with said reservoir being arranged and adapted to have a plurality of apertures therethrough and a valve member in connection with each of said apertures, said valve members being adapted to yield to the pressure of water within said reservoir to permit the passage of said water through said apertures and to yield to the pressure of subsurface waters thereabout to prevent the entrance of subsurface waters into said reservoir through said apertures.

These and other objects and advantages of the invention will be set forth in the following description made in connection with the accompanying drawings in which like reference characters refer to similar parts throughout the several views and in which:

FIG. 1 is a broken view showing a portion of an underground watering system and showing the device comprising the invention herein in operating position;

FIG. 2 is a broken view on an enlarged scale in side elevation taken on line 2-2 of FIG. 1 as indicated and showing a portion thereof in dotted line;

FIG. 3 is a fragmentary view taken on line 3—3 of FIG. 2 as indicated;

FIG. 4 is a broken view in front elevation with some portions thereof broken away and some portions in dotted line showing a modification of the invention herein;

FIG. 5 is a broken view in vertical section taken on line 5—5 of FIG. 4 as indicated; and FIG. 6 is a view in vertical section taken on line 6—6 of FIG. 5 as indicated.

DESCRIPTION OF A PREFERRED EMBODIMENT

With particular reference to FIG. 1, an underground watering system 10 is shown comprising water lines 12, lengths of which will be connected by T-couplings 14 having upwardly extending sprinkling heads 15. Depending from said T-couplings are drain lines 17 of which one is here shown draining into reservoir 20 which comprises the subject matter of the invention herein and representative of which one is shown in FIG. 1 which will be described in some detail. Said reservoirs will be spaced at appropriate intervals along the water lines with respect to the design of any given underground sprinkling system. Appropriate valve structures, not the subject of the invention herein, will control the drainage of water from the water lines 12 through the drain lines 17.

Said reservoir 20 comprises a housing 22 which preferably is frusto conical in form which form is adapted for relief from soil tension. Said housing 22 will be enclosed and said line 17 extending thereinto will be sealed to the upper wall of reservoir reservior in an appropriate manner.

Drainage will occur through a substantial number of apertures in said housing 22. The apertures may be variously designed for drainage and one embodiment thereof is illustrated in FIGS. 2 and 3.

Said reservoir is provided with apertures or openings 25 spaced thereabout and spaced above each of said openings 25 is a relatively small opening 26. A valve structure 28 overlies the outer side of each of said openings 25 yielding to the pressure of fluid within said housing to have a portion thereof swing away from said opening to permit the drainage of said housing and in a similar manner said portion yields to the pressure of subsurface waters to move against the outer wall of said housing to seal said openings 25.

Said valve structures each comprise a flap or body portion 29 of sufficient size to overlie the openings 25 and extend thereabout and at the upper end of said body portion is a flexible neck portion 30 having an enlarged terminal portion 31 here shown as a T-portion which will be of such size and sufficiently compressible that it may readily be forced through said opening 26 from the outer side of the housing to the inner side thereof to hold said body portion 29 in operating position. Said valve structures will be formed of suitable material having sufficient flexibility between the body portion 29 and the neck portion 30 for swinging movement of said body portion.

With reference to FIGS. 4-6, a modified form 40 of said reservoir 20 is shown having a substantial number of apertures 41 therein and thereabout. Adapted to be used in connection with each of said apertures 41 is a valve structure 45. Said valve structures 45 each comprise a circular base portion 47 which will overlie the outer side of an aperture 41. Overlying the inner side of an aperture 41 is a head portion 50 shown being substantially dome shaped. Connecting said head portion and said base portion is a neck portion 48. Said neck portion is of substantially smaller diameter than is the diameter of the aperture 41 and to be positioned centrally of said opening, said neck portion is provided with a plurality of radial ribs 52 which engage the walls of said aperture. The head portion 51 has a plurality of open bottomed radial grooves 53 extending from the periphery thereof to said neck 48. Said neck portion 48 will be of such length that there will be some movement of said valve structure 45 axially of said aperture 41.

The respective operations of the valve structures 28 and 45 are believed to be quite clear from the above descriptions thereof.

As water drains out of said reservoir 22 it will force the flap or body portion 20 of the valve structure 28 away from the outer side of the opening 25 sufficiently for drainage of the water into the subsoil. Pressure of subsurface waters against the said body portion 29 will move the same into sealing engagement against the outer side of the reservoir 22 about the opening 25 to prevent the entrance of any water thereinto.

The valve structure 45 operates in a manner similar to that of the valve 28. Water draining out of said reservoir 20 will move through the radial grooves 53 of the valve head portion 51 and outwardly through the openings provided by the ribs 52. Said drainage waters will then bear against the base 47 and will move the same sufficiently outwardly of the outer side of said reservoir 40 to drain into subsoil.

The base 47 of said valve structure 45 will yield to the pressure of subsurface waters and bear against the outer wall of said reservoir 40 to seal the aperture 41 against the passage of any subsurface waters into said reservoir.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A drainage reservoir for an underground sprinkling system having in combination:
   an enclosed housing having a drain line from said system running thereinto,
   apertures through the walls of said housing spaced thereabout, and
   a valve structure mounted in operative association with each of said apertures yielding to the pressure of drainage water from within said housing to permit the passage of said water out of said housing and yielding to the oressure of subsurface waters about said housing to seal said apertures against the entrance of said waters into said housing.

2. The structure set forth in claim 1, wherein
   said apertures each comprise a relatively large opening and a relatively small opening thereabove,
   said valve structure comprises a body portion in the form of a flap overlying said relatively large opening,
   said body portion has a neck portion of small transverse dimension adapted to be disposed through said smaller opening to hold said flap portion in operating position overlying said larger opening,
   said neck portion having an enlarged terminal portion at the inner side of said housing adapted to be disposed through said smaller opening to hold said valve member in operating position, and
   said body portion is swingably carried by said neck portion.

3. The structure set forth in claim 1, wherein
   said valve structure comprises
   a base portion which overlies the outer side of an aperture and a head portion which overlies the inner side of said aperture;
   a neck portion is disposed through said aperture connecting said base portion and said head portion and having sufficient length for some movement of said valve structure axially of said aperture,
   said neck portion having a plurality of radial ribs extending outwardly therefrom within said aperture, and
   said head portion having a plurality of underlying open bottom radial grooves
   whereby water will drain out of said reservoir through said radial grooves and through said apertures, the pressure of said water moving said valve structure outwardly of said aperture sufficiently for drainage outwardly of said housing.

4. The structure set forth in claim 1, wherein
   said valve structure comprises
   one portion overlying the outer side of an aperture and a second portion overlying the inner side of said aperture,
   means connecting said portions and providing for movement thereof axially of said aperture, and
   said second portion and said connecting means permitting drainage of water outwardly of said housing.

* * * * *